H. S. STEWART.

Elevators.

No. 5,268. Reissued Feb. 4, 1873.

Witnesses:
Ernst Bilhuber.
C. Wahlen.

Inventor:
Henry Stella Stewart
By
Van Santvoord Mauff
his attys

UNITED STATES PATENT OFFICE.

HENRY S. STEWART, OF NEWARK, NEW JERSEY.

IMPROVEMENT IN ELEVATORS.

Specification forming part of Letters Patent No. 121,822, dated December 12, 1871; reissue No. 5,268, dated February 4, 1873.

*To all whom it may concern:*

Be it known that I, HENRY S. STEWART, formerly of Yreka, California, now residing at Newark, in the county of Essex and State of New Jersey, have invented a new and useful Improvement in Elevators; and I do hereby declare the following to be a full, clear, and exact description thereof, which will enable those skilled in the art to make and use the same, reference being had to the accompanying drawing forming part of this specification, in which drawing—

Figure 1:
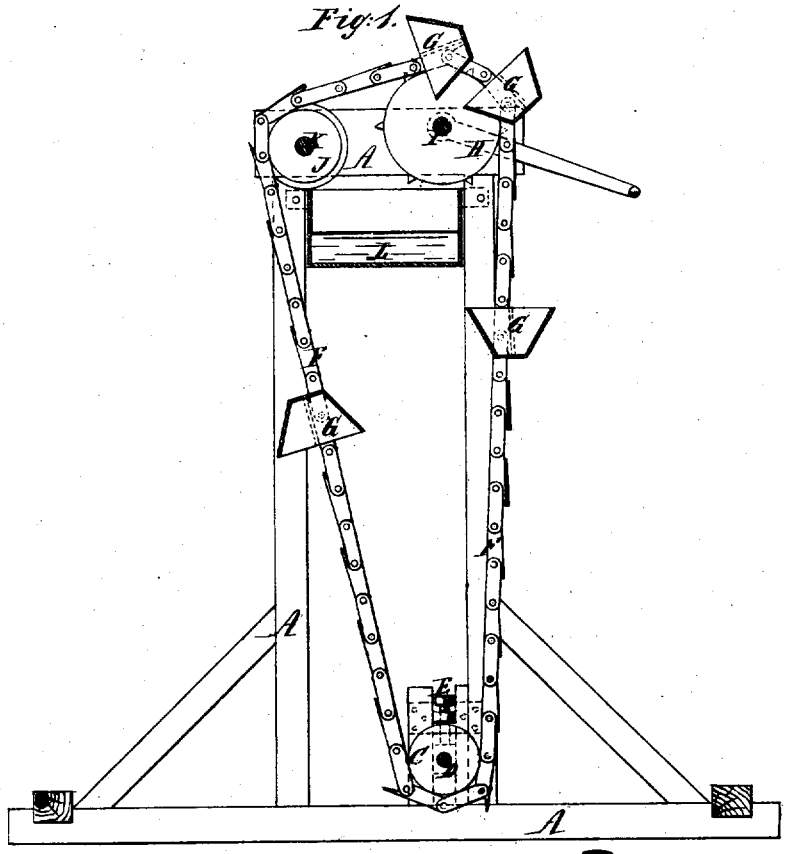
Figure 2:
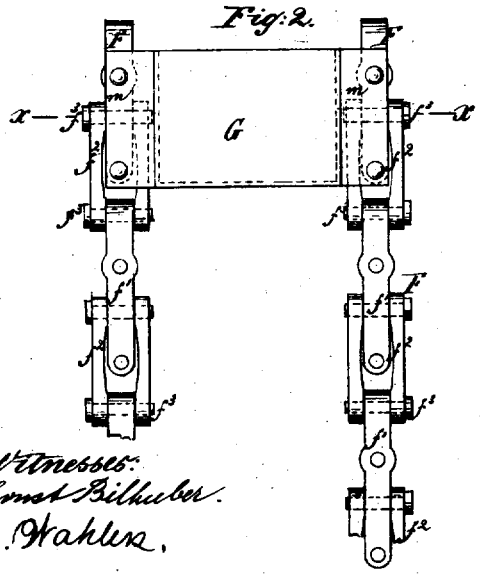
Figure 3:
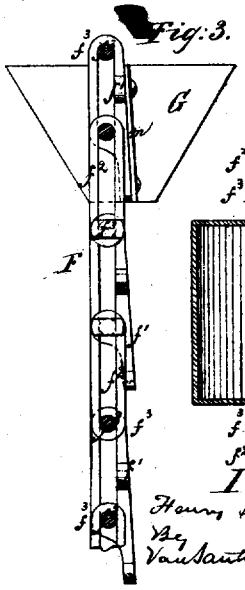
Figure 4:
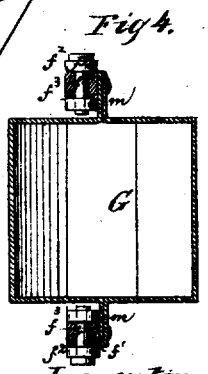

Figure 1 represents a transverse vertical section of my elevator. Fig. 2 is a partial front view of the same in a larger scale than the previous figure. Fig. 3 is a sectional side view of the parts shown in Fig. 2. Fig. 4 is a horizontal section of the same in the plane *x x*, Fig. 2.

Similar letters indicate corresponding parts.

This invention consists in pivoting buckets to hoisting-chains, and supporting the same upon peculiarly-pivoted links of said chains by means of end-flanges, so that, as the buckets in their passage are carried over, two top drums cause the buckets to commence their discharge much sooner than if the links were pivoted at each end; and, further, either of the said links carrying its bucket can be connected and disconnected from the chain when desired.

In the drawing, the letter A designates the frame-work of the elevator, which supports the bearings for the working parts thereof. B is the lower shaft on which are mounted two wheels, C, for the bucket-carrying chains. The journals of the shaft B revolve in movable bearings D that slide up or down in slots or ways formed in or attached to the frame A. With these sliding bearings may be combined set-screws E to prevent them from rising too far. The weight of the chains of the wheels C and of the shaft B serve to keep the chains taut. F are the endless chains to which the buckets G are attached, and which pass around the chain-wheels C. Said chains pass over the spur or chain-wheels H, which are mounted on a shaft, I, the journals of which revolve in stationary bearings attached to the upper part of the frame A. The sweep of or the curve described by the endless chains F and buckets G, at the top of the elevator, is enlarged by means of another set of drums, J, mounted on a shaft, K, the journals of which revolve in the frame A. The wheels J may be placed upon the same level as the wheels H, but I prefer to place them a little lower, as shown in Fig. 1. The endless chains F are formed of two kinds of links, $f^1$ $f^2$, and the bolts $f^3$. The main links $f^1$, with which the buckets G are connected, are so formed that their outer sides may rise a little from their forward ends to bring them in a more convenient position for the attachment of the buckets. The links $f^1$ and $f^2$ are connected with each other by the bolts $f^3$, which are made with a solid head upon each end, one of said heads being round and of such a size that it cannot pass through the slots or cavities of the links, while the other of said heads is flattened on two sides, (see Fig. 3,) so that it can be passed through the slots of the links when said links are slipped toward each other; but, by the tension of the chain, the links, after having been connected, are brought in such a position that the bolts cannot drop out accidentally.

By this construction of the chain I am enabled to take out any of the links with the buckets attached thereto, when desired, and the chains can be readily parted for transportation or other purposes.

The buckets G are made of such a length that they fit between the endless chains F, (see Figs. 2 and 4,) and they are provided with flanges *m*, which project from their ends and are bolted or riveted to the links $f^1$ of the chains. The sides of said buckets are made inclined, so that their upper edges project within the path of the endless chains. (See Figs. 3 and 4.) As the chains are carried successively over the chain-wheels H, the buckets pass between the chain-wheels and discharge their contents into a chute or trough, L, which is situated beneath the shafts I and K; and, since the chains with their buckets are made to pass over the drums J, the chute does not interfere with the motion of the buckets, and it can be readily so placed that it catches all the material discharged from the buckets.

What I claim as new, and desire to secure by Letters Patent, is—

1. The buckets G G, secured between the endless parallel chains F F, and supported by end flanges *m m* upon the links $f^1$ $f^2$ having a free end, as shown, so that said links lift and turn the buckets as the chains pass over two drums arranged above a lower drum, as herein set forth, for the purpose specified.

2. The endless chains F, formed by the combination of the slotted links $f^1$ $f^2$ and bolts $f^3$, the latter being made with a round head at one and a flattened head at the opposite end, substantially as described.

HENRY STELLA STEWART.

Witnesses:
W. HAUFF,
E. F. KASTENHUBER.